Oct. 18, 1932.　　　J. DAUSTER　　　1,883,601

HYDRAULIC CLUTCH

Filed Nov. 19, 1930　　　3 Sheets-Sheet 1

John Dauster
INVENTOR
BY Victor J. Evans
and A. L. Evans
ATTORNEYS

Oct. 18, 1932.  J. DAUSTER  1,883,601
HYDRAULIC CLUTCH
Filed Nov. 19, 1930  3 Sheets-Sheet 2
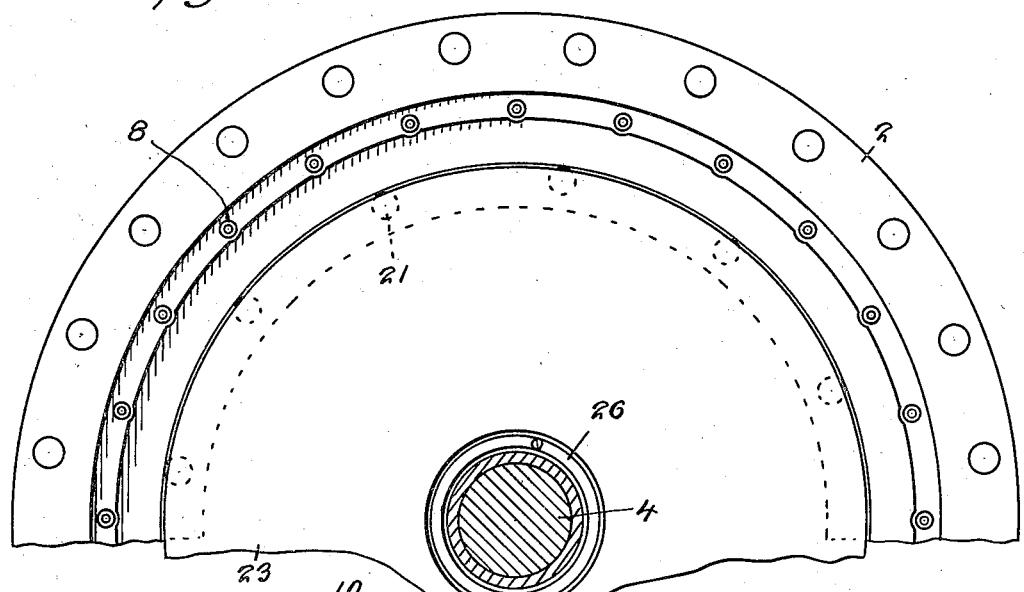
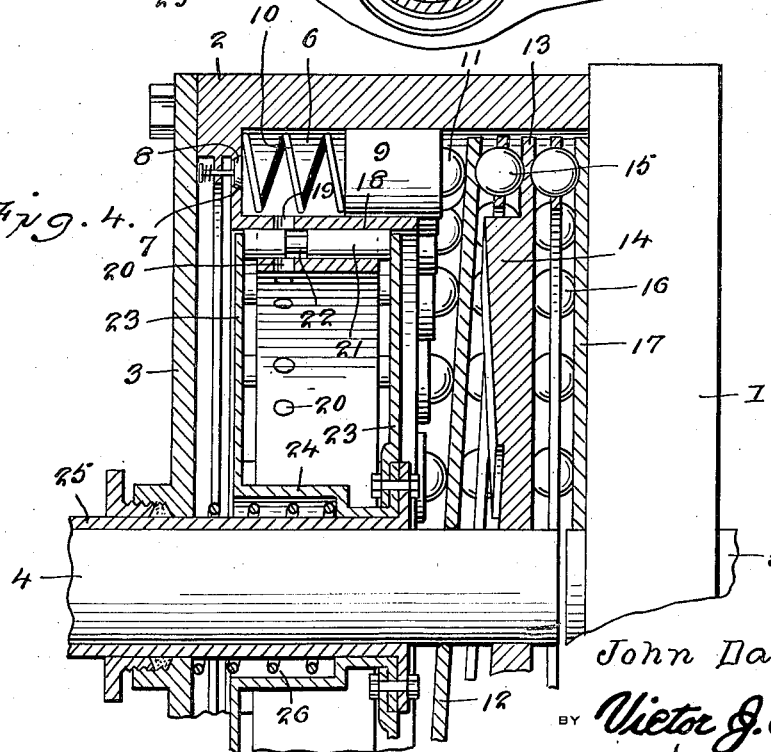
John Dauster
INVENTOR Oct. 18, 1932.  J. DAUSTER  1,883,601
HYDRAULIC CLUTCH
Filed Nov. 19, 1930   3 Sheets-Sheet 3

John Dauster
INVENTOR

BY Victor J. Evans
and A. L. Evans ATTORNEYS

Patented Oct. 18, 1932

1,883,601

UNITED STATES PATENT OFFICE

JOHN DAUSTER, OF WILKINSBURG, PENNSYLVANIA

HYDRAULIC CLUTCH

Application filed November 19, 1930. Serial No. 496,735.

This invention relates to a hydraulic clutch, the general object of the invention being to provide means whereby the driven member can be actuated from the drive member from very low speed to very high speed with the use of only one forward gear. The invention also prevents slippage and it also eliminates the use of linings and makes it unnecessary to use second or low gears on hills.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 3 is a view looking into the rear end of the device, with the rear end plate removed.

Figure 4 is a partial sectional view, showing the parts in a different position from what they occupy in Figure 1.

Figure 1:
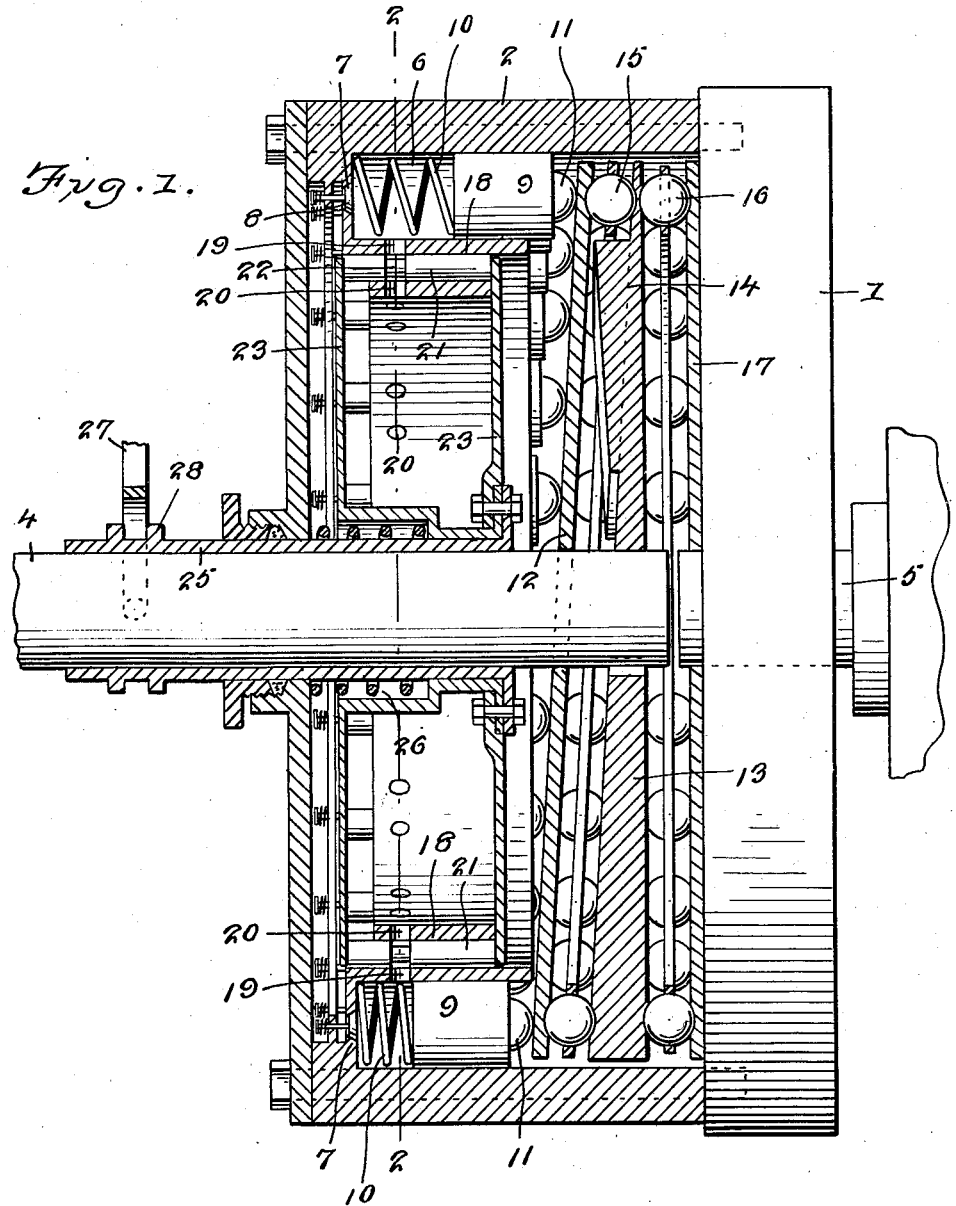
Figure 1 is a sectional view through the invention, showing parts in elevation, the section being taken on line 1—1 of Figure 2.

In these drawings, the numeral 1 indicates the fly wheel of a motor and the numeral 2 indicates a casing which is bolted to the fly wheel and is provided with an end cover plate 3. The driven shaft 4 extends into the casing through the end plate and this shaft terminates adjacent the rear end of the fly wheel shaft 5. The casing carries an annular row of cylinders 6 which have their forward ends opening out into the casing and their rear ends are formed with the ports 7 which are controlled by the spring actuated valves 8 which open into the cylinders. A piston 9 is arranged in each cylinder and is pressed forwardly by a spring 10 in the cylinder. The outer or forward end of each piston is formed with a semi-spherical member 11 and these members engage a plate 12 located in the casing and tiltably arranged on the shaft 4. A cam plate 13 is fastened to the shaft 4 and is formed with the counter-balancing weights 14. Ball bearings 15 are arranged between the cam parts of this plate and the plate 12 and ball bearings 16 are placed between the cam plate and a plate 17 which bears against the fly wheel. As shown, the cam parts are arranged at the periphery of the cam plate so that these parts will cause a tilting movement of the plate 12 which will act on the members 11 of the pistons and thus produce a reciprocatory motion of the pistons.

An annular row of valve bores 18 is formed in the casing. Each bore has its ends open and a port 19 connects each bore with a cylinder and an oppositely arranged port 20 connects each bore with the interior of the casing. A plunger-like valve 21 is located in each bore and has an annular groove 22 therein which will connect the ports together when the valve is in a certain position so that the fluid in the casing can pass into the cylinder or flow back into the casing when the piston is moved inwardly against the action of its spring 10.

Front and rear plates 23 have their peripheries engaging the ends of the valves and these plates are connected together by a tubular part which surrounds a sleeve 25 slidably mounted on the shaft 4. The front plate 23 and the front end of the tubular part are connected to a flange on the forward end of the sleeve, so that the plates will move with the sleeve. A spring 26 tends to hold the plates in a forward position with the valves closing the ports 19 and 20. The sleeve is adjusted by a lever or pedal 27 having its forked end engaging a groove 28 in the rear part of the sleeve.

Figure 2:
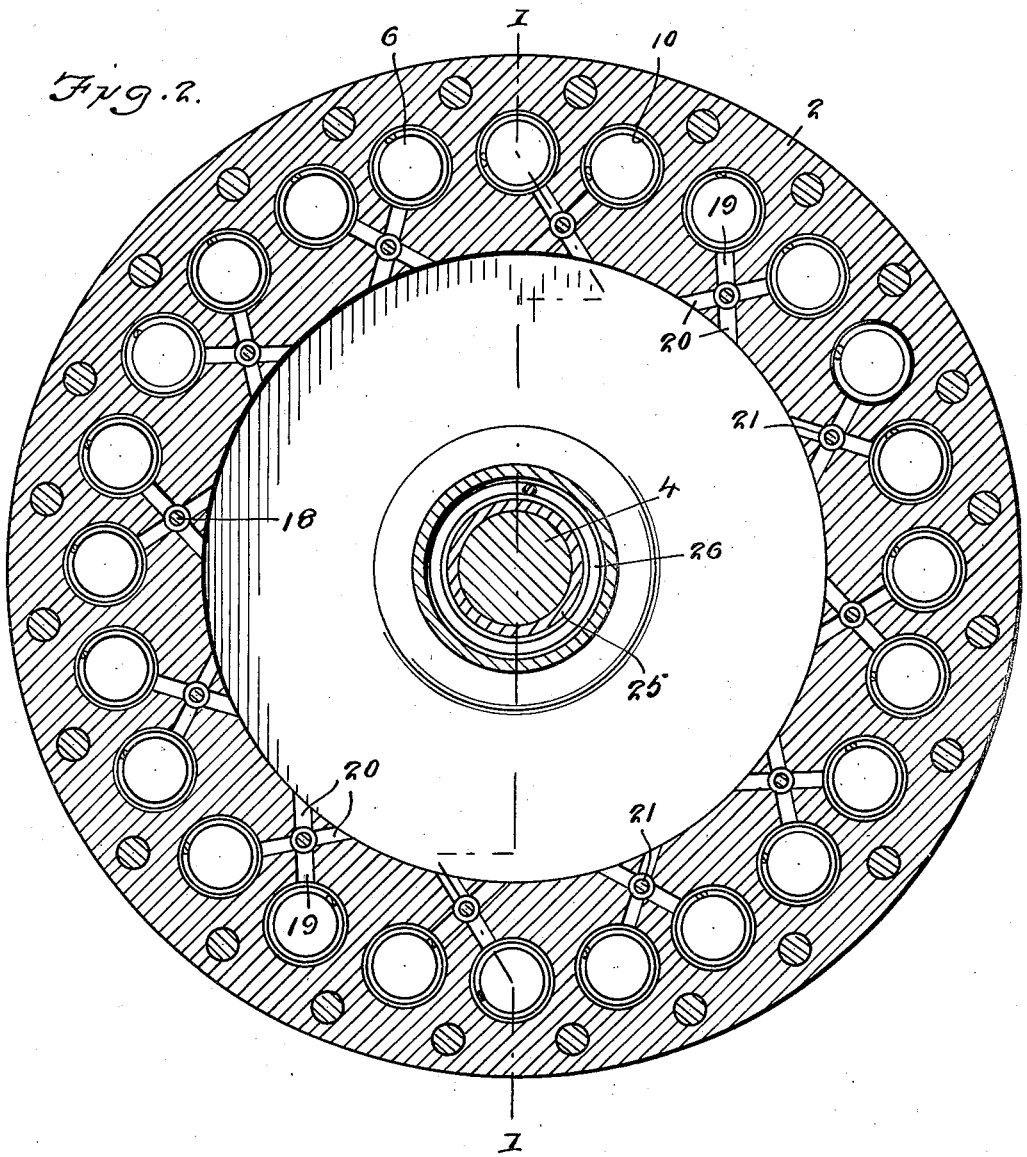
Figure 2 is a section on line 2—2 of Figure 1.
Figure 5:
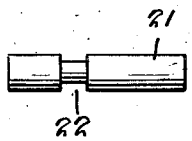
Figure 5 is a view of one of the valve plungers.

I prefer to arrange the ports 19 and 20 of each pair of cylinders in the form of an X, as shown in Figure 2, so that one valve will control the ports of each pair of cylinders.

From the foregoing it will be seen that the casing and the cylinders and pistons will rotate with the fly wheel and if the valves are in open position, the pistons will move inwardly as they are acted on by the high parts of the cam member as the fluid has a free passage from the cylinders and will not check the inward movements of the pistons. The springs 10 force the pistons outwardly as they come opposite the low parts of the cam member. When it is desired to connect the driven shaft with the power, the sleeve is shifted by the member 27 so as to cause the plates 23 to partly close the valves so as to check the flow of fluid from the cylinders. Thus the inward movement of the pistons is resisted by the fluid in the cylinders so that the cam member is caused to move with the casing as the pistons cannot move inwardly quickly enough to avoid setting up a wedging action on the high parts of the cam member. Thus the cam member will move with the casing, but there is a certain amount of slippage as the pistons move slowly inwardly. As the pistons move outwardly, the valves 8 will open to permit fluid to enter the cylinders to prevent a vacuum occurring therein. A further movement of the sleeve will still further close the valves so that the fluid will offer more resistance to the inward movement of the pistons and thus the wedging action between the pistons and cam member will be increased so that the driven shaft will be rotated at greater speed and then when the valves are entirely closed, the driven shaft will be locked to the casing and it will rotate at the same speed as the engine.

Thus I have provided simple means for driving a driven shaft from a drive shaft at any desired speed.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the kind described comprising driving and driven members, a casing containing fluid fixed to the driving member, a wedging member on the driven member, inner and outer cylinders in the casing, spring tensioned pistons in the outer cylinders and operated upon by the wedging member, valves in the inner cylinders and controlling the flow of liquid to and from the outer cylinders, means engaging opposite ends of the valves for moving the same, and means for moving the first named means.

2. A device of the kind described comprising driving and driven members, a casing containing fluid fixed to the driving member, a wedging member on the driven member, inner and outer cylinders in the casing, spring tensioned pistons in the outer cylinders and operated upon by the wedging member, valves in the inner cylinders and controlling the flow of fluid to and from the outer cylinders, means engaging opposite ends of the valves for moving the same, means for moving the first named means, and means tensioning the first named means.

3. A device of the kind described comprising driving and driven members, a casing containing fluid fixed to the driving member, a wedging member on the driven member, inner and outer cylinders in the casing, spring tensioned pistons in the outer cylinders and operated upon by the wedging member, valves in the inner cylinders and controlling the flow of fluid to and from the outer cylinders, means engaging opposite ends of the valves for moving the same, means for moving the first named means, means tensioning the first named means, and a tiltable plate between the wedging member and pistons.

4. A device of the kind described comprising driving and driven members, a casing containing fluid fixed to the driving member, a wedging member on the driven member, inner and outer cylinders in the casing, spring tensioned pistons in the outer cylinders and operated upon by the wedging member, valves in the inner cylinders and controlling the flow of fluid to and from the outer cylinders, means engaging opposite ends of the valves for moving the same, means for moving the first named means, means tensioning the first named means, a tiltable plate between the wedging member and pistons, and operatively disposed anti-friction devices interposed between the tiltable plate and wedging member and between the latter and casing.

5. A device of the kind described comprising driving and driven members, a casing containing fluid fixed to the driving member, a wedging member on the driven member, inner and outer cylinders in the casing, spring tensioned pistons in the outer cylinders and operated upon by the wedging member, valves in the inner cylinders and controlling the flow of fluid to and from the outer cylinders, means engaging opposite ends of the valves for moving the same, means for moving the first named means, means tensioning the first named means, a tiltable plate between the wedging member and pistons, operatively disposed anti-friction devices interposed between the tiltable plate and wedging member and between the latter and casing, and check valves opening inwardly of the piston cylinders.

In testimony whereof I affix my signature.

JOHN DAUSTER.